(12) United States Patent
Post et al.

(10) Patent No.: US 8,661,189 B2
(45) Date of Patent: Feb. 25, 2014

(54) SYSTEMS AND METHODS FOR TRIMMING LOGICAL BLOCK ADDRESSES CORRESPONDING TO A DATA STRUCTURE RESIDING IN NON-VOLATILE MEMORY

(75) Inventors: Daniel J. Post, Cupertino, CA (US);
Eric Tamura, Sunnyvale, CA (US);
Matthew Byom, Campbell, CA (US);
Neil Crane, Palo Alto, CA (US);
Kenneth Herman, San Jose, CA (US);
Francois Barbou-des-Place, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 597 days.

(21) Appl. No.: 12/872,849

(22) Filed: Aug. 31, 2010

(65) Prior Publication Data

US 2012/0054465 A1 Mar. 1, 2012

(51) Int. Cl.
*G06F 12/06* (2006.01)
(52) U.S. Cl.
USPC .............................. 711/103; 711/159; 711/206
(58) Field of Classification Search
None
See application file for complete search history.

(56) References Cited

U.S. PATENT DOCUMENTS

| | | | |
|---|---|---|---|
| 5,860,083 A * | 1/1999 | Sukegawa | 711/103 |
| 2007/0106853 A1* | 5/2007 | Evanchik et al. | 711/159 |
| 2008/0263305 A1* | 10/2008 | Shu et al. | 711/170 |
| 2008/0307158 A1* | 12/2008 | Sinclair | 711/103 |
| 2009/0164715 A1* | 6/2009 | Astigarraga et al. | 711/112 |
| 2010/0217927 A1* | 8/2010 | Song et al. | 711/103 |
| 2011/0145306 A1* | 6/2011 | Boyd et al. | 707/824 |
| 2011/0271037 A1* | 11/2011 | Oh et al. | 711/103 |

* cited by examiner

*Primary Examiner* — Kaushikkumar Patel
(74) *Attorney, Agent, or Firm* — Van Court & Aldridge LLP (57) ABSTRACT

Systems and methods for trimming LBAs are provided. The LBAs can be trimmed from a file and from an NVM interface that maintains a logical-to-physical translation of the file's LBAs and controls management of the file's contents stored on non-volatile memory ("NVM"). The file can be any suitable file that has any number of associated LBAs. In addition, the file can be linked to one or more data chunks stored in the NVM, each data chunk associated with LBAs in the file. When a data chunk is retrieved or read from the NVM, that chunk no longer needs to be maintained in the NVM. Accordingly, after the data chunk is retrieved from the NVM and provided to an appropriate destination, the LBAs associated with the retrieved data chunk can be trimmed.

20 Claims, 6 Drawing Sheets

---

PROVIDING A SWAP FILE HAVING A PLURALITY OF LOGICAL BLOCK ADDRESSES ("LBAs") ASSOCIATED WITH DATA STORED IN THE NVM — 410

PAGING IN SWAP FILE DATA FROM THE NVM — 420

TRIMMING THE LBAs ASSOCIATED WITH THE PAGED-IN SWAP FILE DATA — 430

SYSTEMS AND METHODS FOR TRIMMING LOGICAL BLOCK ADDRESSES CORRESPONDING TO A DATA STRUCTURE RESIDING IN NON-VOLATILE MEMORY

BACKGROUND

NAND flash memory, as well as other types of non-volatile memories ("NVMs"), are commonly used for mass storage. For example, consumer electronics such as portable media players often include flash memory to store music, videos, and other media.

NAND flash memory systems maintain a mapping of logical to physical addresses to permit a file system to write or read data from the NVM. The mapping may be required because the file system may provide read and write requests that are not directly compatible with NVM. For example, the logical addresses may use conventions or protocols typical of hard-drive-based systems. A hard-drive-based system, unlike flash memory, can overwrite a memory location without first performing a block erase. Moreover, hard drives may not need to perform operations such as wear leveling and garbage collection. Therefore, the overhead required in managing content stored in a NAND flash type of NVM can be greater than that of hard-drive based systems.

This is particularly evident in situations where the system has data stored in a file or database on the NVM, but that data is no longer needed. For example, the file can be a swap file or page file (used in connection with a virtual memory scheme) that has had data paged out. Once the data is paged in, and returned to main memory, it is no longer required to be stored in NVM. However, unless specific action is taken by the file system, the NVM manager is still required to manage that data because the swap file is still marked as allocated according to the file system. Absent any such file system action, the operating efficiency of the system can be reduced.

SUMMARY

Systems and methods are disclosed for trimming logical block addresses (LBAs) within a file stored within NVM. Trimming the LBAs frees those LBAs for subsequent usage within the file and eases the NVM management burden.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Systems and methods for trimming LBAs are provided. The LBAs can be trimmed from a file and from an NVM interface that maintains a logical-to-physical translation of the file's LBAs and controls management of the file's contents stored on NVM. The file can be any suitable file that has any number of associated LBAs. In addition, the file can be linked to one or more data chunks stored in NVM, with each data chunk associated with LBAs in the file. When a data chunk is retrieved or read from NVM, and it is determined that that chunk no longer needs to be maintained in NVM, the LBAs associated with the retrieved data chunk can be trimmed from within the file.

When LBAs are trimmed from the file, the file itself is maintained and is not deleted, but the trimmed LBAs are de-allocated for subsequent usage in the file. In addition, the data chunk that had been retrieved may eventually be erased by the NVM interface, but only that data chunk is erased, not all of the data linked to the file. For example, the NVM interface may invalidate the data chunk stored in the NVM. This results in that data chunk being discarded during a management event such as wear-leveling or garbage collection. Thus, trimming of LBAs results in a selective deletion of content within a file without deleting the entire file.

Figure 1:
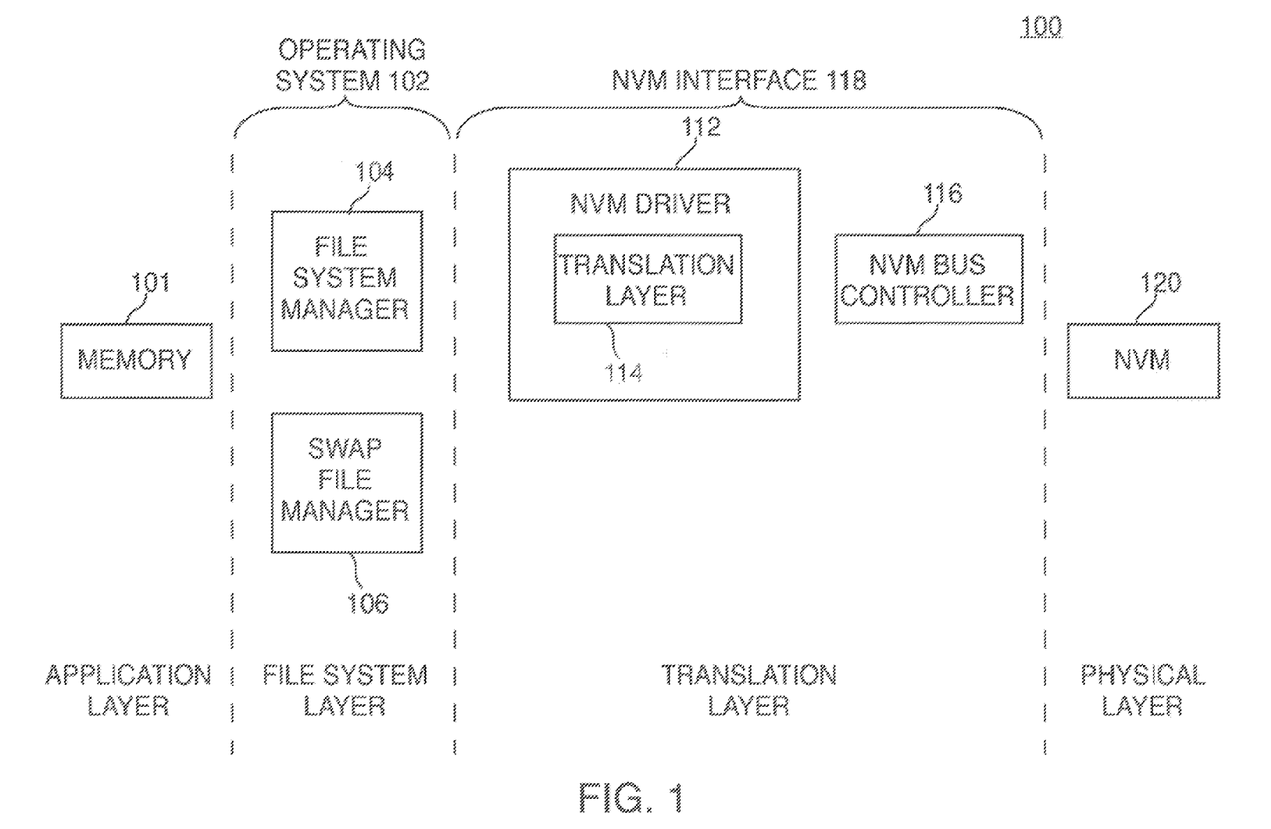
FIG. 1 is an illustrative block diagram of a system in accordance with various embodiments of the invention.

FIG. 1 illustrates a block diagram of a combination of firmware, software, and hardware components of system 100 in accordance with an embodiment of the invention. System 100 can include control circuitry (not shown) that can control system operation through use of one or more processors. In addition, FIG. 1 also illustrates various software/hardware layers in which the functionality of the components may be implemented. The layers can include an application layer, a file system layer, a translation layer, and a physical layer, all discussed below in more detail below. As shown, dashed lines demarcate the layers. It is understood that the depiction of which components fall within the demarcation lines are merely illustrative and that one or more components can be affiliated with a different layer.

System 100 can include memory 101, file system manager 104, swap file manager 106, NVM driver 112, NVM bus controller 116, and NVM 120. In some embodiments, swap file manager 106, file system manager 104 and NVM driver 112 may be software or firmware modules, and memory 101, NVM bus controller 116 and NVM 120 may be hardware modules. Accordingly, in these embodiments, NVM driver 112 may represent the software or firmware aspect of NVM interface 118, and NVM bus controller 116 may represent the hardware aspect of NVM interface 118. In addition, file system manager 104 and swap file manager 106 may be part of operating system 102. In one embodiment, swap file manager 106 may be implemented in a kernel (not shown), which is part of operating system 102.

Memory 101 can include any suitable type of volatile or non-volatile memory, such as dynamic random access memory ("DRAM"), synchronous dynamic random access memory ("SDRAM"), double-data-rate ("DDR") RAM, cache memory, read-only memory ("ROM"), or any combination thereof. Memory 101 can include a data source that can temporarily store user data for programming into or reading from non-volatile memory 120. In some embodiments, memory 101 may contain data to run programs in the application layer. In addition, memory may also contain data to run portions of operating system 102 such as file system manager 104 (and thus may also pertain to the file system layer).

NVM 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof. NVM 120 can be organized into "blocks", which is the smallest erasable unit, and further organized into "pages", which can be the smallest unit that can be programmed or read. In some embodiments, NVM 120 can include multiple dies, where each die may have multiple blocks. The blocks from corresponding die (e.g., blocks having the same position or block number) may form "super blocks". Each memory location (e.g., page or block) of NVM 120 can be addressed using a physical address (e.g., a physical page address or physical block address).

File system manager 104 can include any suitable type of file system, such as a File Allocation Table ("FAT") file system or HFS file system, and may be part of operating system 102. File system manager 104 may manage file and folder structures required for system 100 to function. For example, one file that file system manager 104 can manage is a file having one or more data chunks that can be discarded after a given data chunk has been retrieved from NVM. A specific example of such a file is a swap file, which is used in virtual memory schemes.

File system manager 104 may provide write and read commands to NVM driver 112 when an application or operating system 102 requests that information be read from or stored in NVM 120. Along with each read or write 30 command, file system manager 104 can provide a logical address to indicate where the data should be read from or written to, such as a logical page address or a logical block address with a page offset. A swap file, for example, has LBAs associated with all of its data chunks.

File system manager 104 may provide read and write requests to NVM driver 112 that are not directly compatible with NVM 120. For example, the LBAs may use conventions or protocols typical of hard-drive-based systems. A hard-drive-based system, unlike flash memory, can overwrite a memory location without first performing a block erase. Moreover, hard drives may not need wear leveling to increase the lifespan of the device. Therefore, NVM interface 118 can perform any functions that are memory-specific, vendor-specific, or both to handle file system requests and perform other management functions in a manner suitable for NVM 120.

File system manager 104 can allocate different files. Some of these files are data files that can be deleted. When a file is deleted or truncated, file system manager 104 de-allocates the entire file; that is, file system manager 104 trims every LBA associated with the file it is deleting. Other files, such as a swap file, may not be deleted in full, but may have portions thereof not in use, even though it retains its original size. Thus, because the swap file will not be truncated or deleted, it will not be deallocated by file system manager 104, and accordingly will not issue a command to trim the LBAs associated with the swap file. Even though file system manager 104 cannot trim portions of the swap-file, embodiments of this invention can selectively trim LBAs within the swap file.

NVM driver 112 can include translation layer 114. In some embodiments, translation layer 114 may be or include a flash translation layer ("FTL"). On a write command, translation layer 114 can map the provided logical address to a free, erased physical location on NVM 120. On a read command, translation layer 114 can use the provided logical address to determine the physical address at which the requested data is stored. Because each NVM may have a different layout depending on the size or vendor of the NVM, this mapping operation may be memory and/or vendor-specific. Translation layer 114 can perform any other suitable functions in addition to logical-to-physical address mapping. For example, translation layer 114 can perform any of the other functions that may be typical of flash translation layers, such as garbage collection and wear leveling.

NVM driver 112 may interface with NVM bus controller 116 to complete NVM access commands (e.g., program, read, and erase commands). Bus controller 116 may act as the hardware interface to NVM 120, and can communicate with NVM 120 using the bus protocol, data rate, and other specifications of NVM 120.

NVM interface 118 may manage NVM 120 based on memory management data, sometimes referred to herein as "metadata". The metadata may be generated by NVM driver 112 or may be generated by a module operating under the control of NVM driver 112. For example, metadata can include any information used for managing the mapping between logical and physical addresses, bad block management, wear leveling, ECC data used for detecting or correcting data errors, or any combination thereof. The metadata may include data provided by file system manager 104 along with the user data, such as a logical address. Thus, in general, "metadata" may refer to any information about or relating to user data or used generally to manage the operation and memory locations of a non-volatile memory.

NVM interface 118 may be configured to store metadata in NVM 120. In some embodiments, NVM interface 118 can store translation table metadata separate from user data. Translation table metadata can be stored in non-user data regions (e.g., index pages) of NVM specifically reserved for such metadata. In addition, translation table metadata can be stored in a data structure (e.g., a tree) contained in memory 101. When an LBA is trimmed, but not immediately erasable, this LBA can be marked in the non-user data regions of NVM and/or the data structure contained in memory 101 as not valid. That is, the translation table metadata can include a flag that indicates whether data pertaining to one or more memory locations is valid. If the data is marked invalid, NVM interface 118 may manage that data differently than valid data. For example, valid data is preserved in NVM 120 during management events such as refresh events, wear leveling, and garbage collection, whereas invalid data is not.

In other embodiments, NVM interface 118 may store metadata associated with user data at the same memory location (e.g., page) in which the user data is stored. This metadata is different than the translation table metadata. For example, NVM interface 118 may store user data, the associated logical address, and ECC data for the user data at one or more memory locations of NVM 120. NVM interface 118 may also store other types of metadata about the user data in the same memory location.

In some embodiments, file system manager 104 may write the contents of volatile memory, such as memory 101 to NVM 120 as part of a virtual memory scheme. In a virtual memory scheme, NVM 120 may be used as virtual memory whenever there is insufficient space available in memory 101. When space is needed in memory 101, data is paged out of memory 101 into a file stored in NVM 120, thereby freeing up space in memory 101. This file is sometimes referred to as a swap file or a page file, which contains data that previously resided in memory 101, but is now stored in NVM 120. File system manager 104 may maintain the swap file, which includes the LBAs corresponding to data stored in NVM 120.

Swap file manager 106 can handle the transfer of data between memory 101 and NVM 120. During a page-out operation, swap file manager 106 extracts a chunk of data from memory 101 and provides it to NVM interface 118, which writes the data chunk into NVM 120. Paged-out data is a "snap-shot" of a volatile memory data chunk that is "frozen" in NVM 120. In a page-in operation, swap file manager receives a data chunk from NVM 120 and places it into memory 101. Paged-in data is the replacement of a "frozen" volatile memory "snap-shot" of a data chunk back into memory 101.

When a program or application running on system 100 attempts to access data in memory 101, but that data is not present, file system manager 104 and swap file manager 106 can operate in concert to page-in the required data. For example, via NVM interface 118, file system manager 104 can pass the appropriate LBAs from the swap file to NVM 120, which then retrieves the data and provides it to swap file manager 106. After that data is paged in, this data may never need to be accessed from NVM 120 again. This may be because that data is placed in volatile memory 101 and enables the program or application to resume its operation from the point when the data was paged out, and as such, the program or application will have no need for the data stored in NVM after it is paged in.

Swap file manager 106 can issue a command, in response to a successful page in event, to trim the LBAs associated with the data that was paged in. For convenience, the LBAs to be trimmed are referred to herein as trimmable LBAs and are LBAs that exist within the swap file and that no longer need to be managed by file system manager 104, NVM interface 118 or stored in NVM 120. By trimming LBAs, management overhead is decreased and additional free space can be made more readily available in NVM 120. In response to the trim command issued by swap file manager 106, NVM interface 118 can mark the trimmable LBAs as invalid or delete them from a mapping table.

Figure 2A:
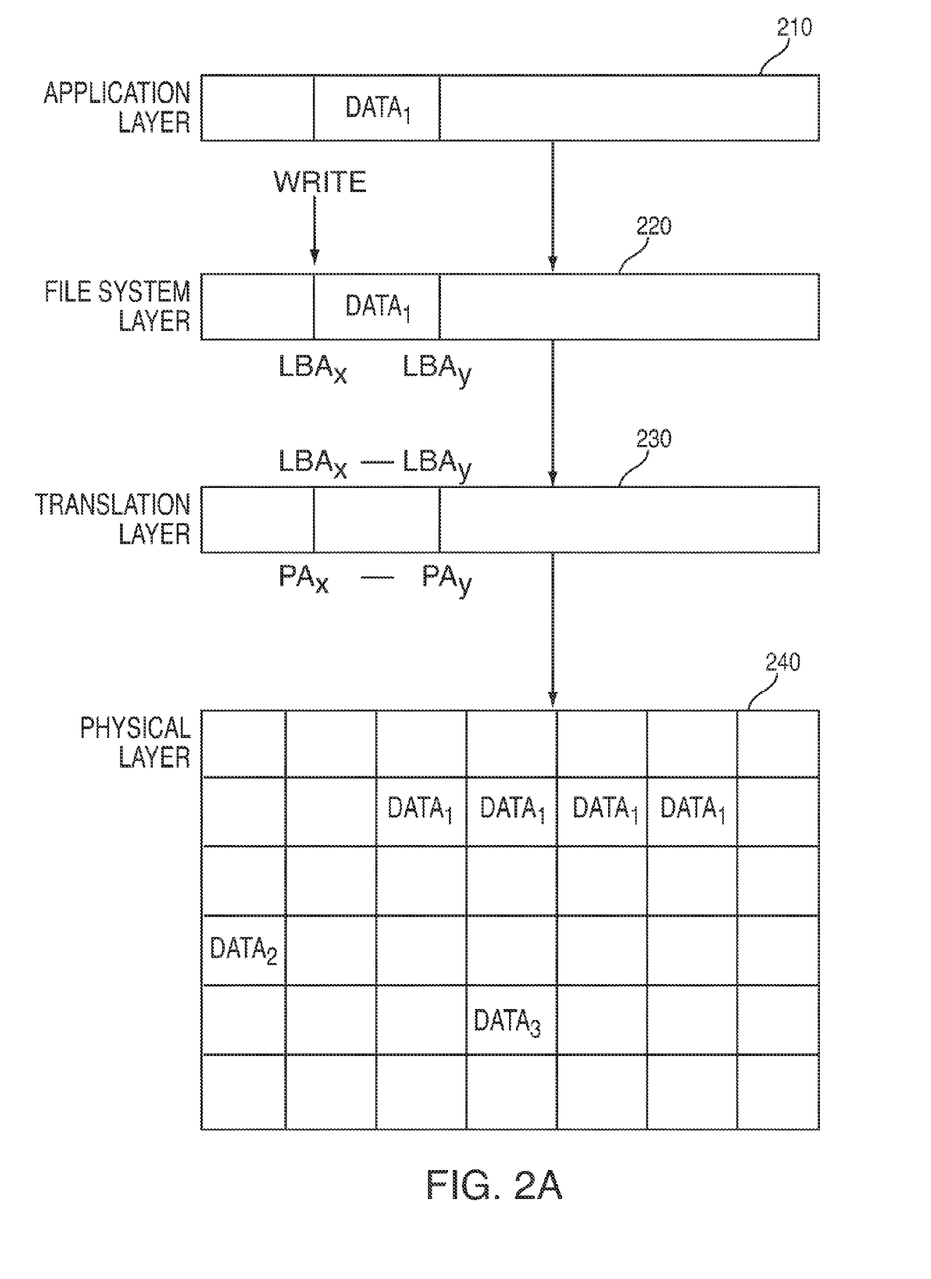
FIGS. 2A-2C are illustrative block diagrams of a software/hardware stack shown at different stages of a swap operation in accordance with embodiments of the invention.
Figure 2B:
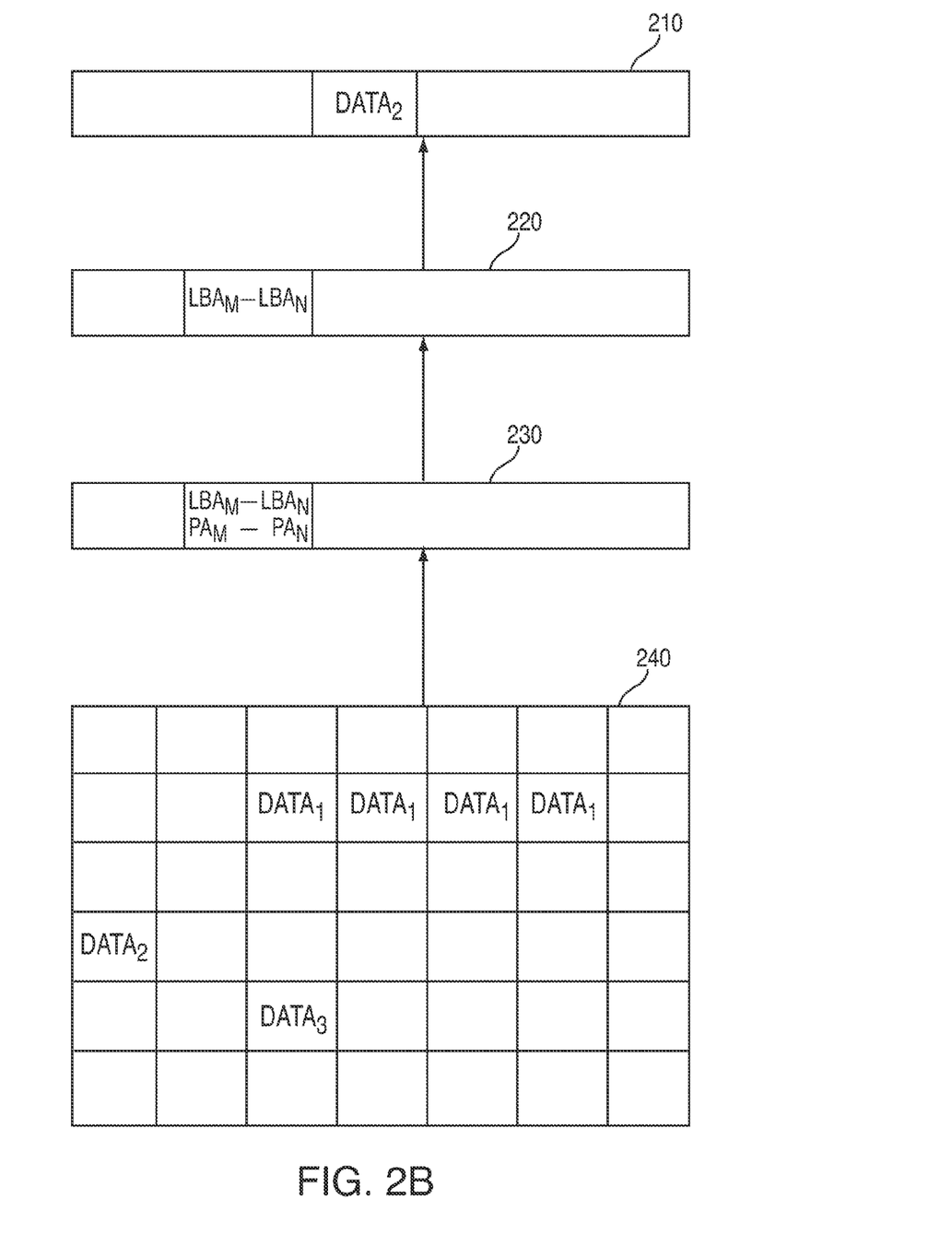
Figure 2C:
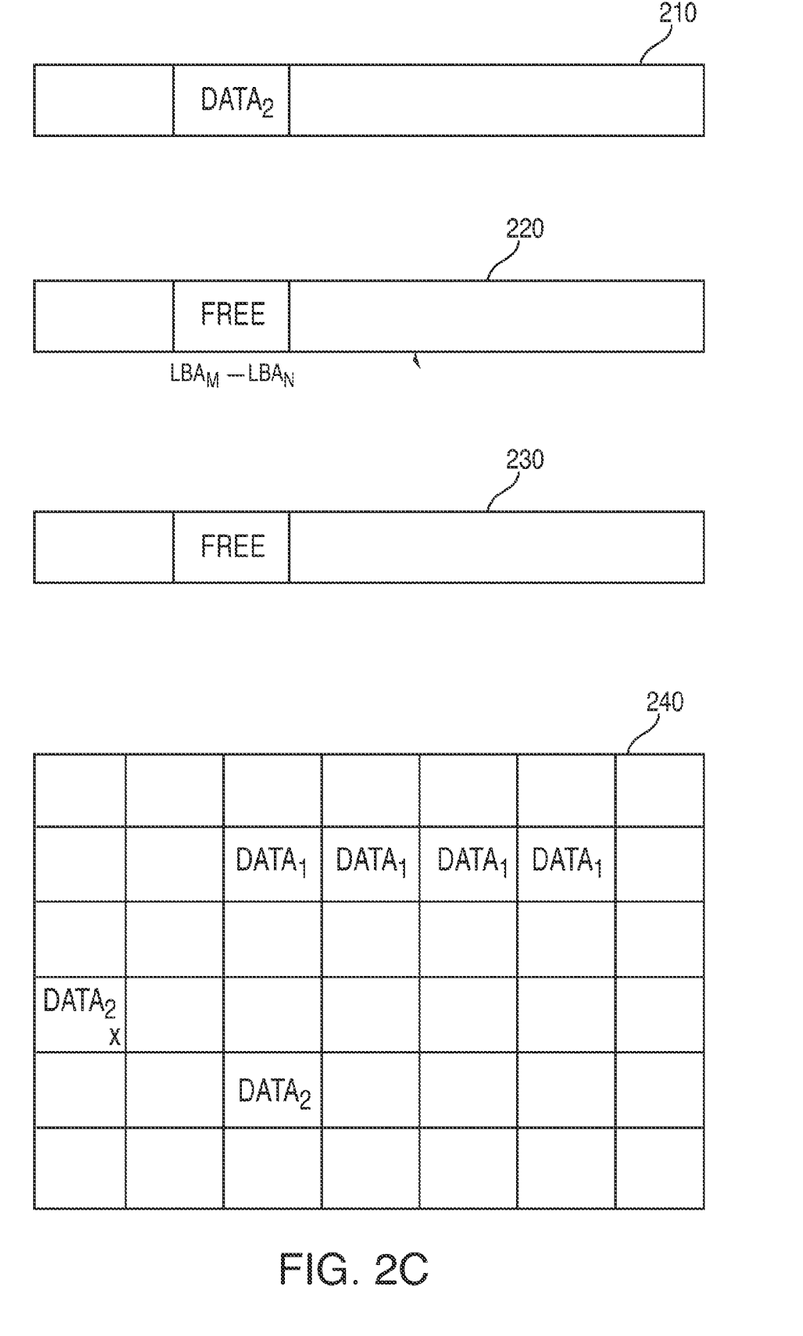

Referring now to FIGS. 2A-2C, a series of illustrative block diagrams of a software/hardware stack are shown at different stages of a swap operation in accordance with embodiments of the invention. In particular, FIG. 2A illustrates the stack during a page out operation, FIG. 2B illustrates the software stack during a page in operation, and FIG. 2C illustrates the stack after a trimming operation. The software may run on top of system 100 of FIG. 1, for example. The stack can include application layer 210, file system layer 220, translation layer 230, and physical layer 240.

Referring specifically now to FIG. 2A, DATA1 shown in application layer 210 may represent a chunk of data that requires paging out. Data that is being paged out is stored as part of a swap or page file, which is kept in physical layer 240. When DATA1 is written to the swap file in physical layer 240, a file system manager in file system layer 220 may assign the contents of DATA1 to as many LBAs as necessary and issue write commands to translation layer 230. These LBAs are labeled as LBAx-LBAy and may be included as part of a swap file LBA range.

Translation layer 230 may be implemented as part of an NVM interface such as NVM interface 118 of FIG. 1. Translation layer 230 may translate the LBAs corresponding to DATA1 (i.e., LBAx-LBAy) to physical addresses in physical layer 240. The physical addresses are shown as PAx-PAy. This mapping of logical-to-physical addresses may be maintained in translation layer 230. DATA1 can be stored in one or more pages, blocks, or superblocks of physical layer 240. As shown, other paged out data (e.g., DATA2 & DATA3) are also stored in physical layer 240. DATA2 and DATA3 may also form part of the swap file and have their respective LBAs mapped in translation layer 230.

After the paged out data has been written to the physical layer, this data as well as its logical-to-physical mapping is managed by the NVM interface. For example, blocks storing page out data (e.g., DATA1) and other data may be subject to NVM management events such as wear leveling, refresh, and garbage collection operations. In addition, some of these operations may require updates to the logical-to-physical mapping, thus requiring an added layer of management.

Referring specifically now to FIG. 2B, a page in operation is illustrated. In this operation, DATA2 is paged in from physical layer 240 to application layer 210. A page in operation may begin when an application or program running in application layer 210 requires access to paged out data. When paged out data is required, file system layer 220 may issue a read instruction, including the LBAs it needs to read, to logical layer 230. As shown, the LBAs for DATA2 are labeled as LBAm-LBAn. Translation layer 230 translates these LBAs to their respective physical addresses and causes the physical layer to provide data stored at those physical addresses. In this example, DATA2 is read and provided to application layer 210.

After DATA2 has been paged in, the logical-to-physical mappings for DATA2 still exist in translation layer 230 and DATA2 still exists in physical layer 240. As a result, NVM interface can continue to manage these mappings and data.

Referring now specifically to FIG. 2C, a trimming operation is discussed. A trimming operation can be performed after data has been paged in. As illustrated in FIG. 2C, DATA2 represents data that has been paged in. Because DATA2 has been paged in and resides in application layer 210, it is no longer needed in physical layer 240, nor is there any need to maintain its associated mapping in translation layer 230. Thus, this portion of the swap file is no longer needed. Accordingly, the LBAs (i.e., LBAm-LBAn) can be trimmed from translation layer 230.

When the LBAs are trimmed, they may be available for reuse in the LBA range for the swap file, in the file system layer. In addition, once they are trimmed, there is no need to manage logical-to-physical mappings in translation layer 230. Moreover, after the LBAs are released, one or more pages, blocks, or superblocks may be marked as invalid, thereby eliminating the need to move the contents of DATA2 to a new location during a refresh, wear leveling, garbage collection or other suitable operation that requires preservation the data. DATA2 includes an X to indicate it has bee marked as invalid.

Figure 3:
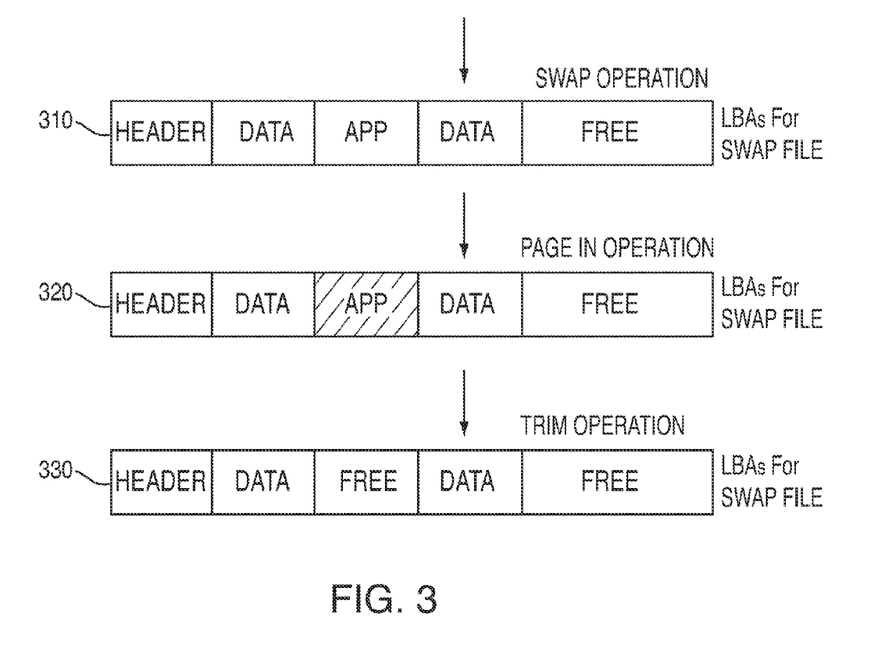
FIG. 3 shows several illustrative file system layers at different stages of an operation in accordance with an embodiment of the invention.

FIG. 3 shows several illustrative file system layers 310, 320, 330, each representing LBAs for the same swap file at different stages of a trimming operation in accordance with an embodiment of the invention. Layer 310 shows the state of the swap file LBAs (e.g., LBAs associated with a header, data, APP, data, and free LBAs) when a swap operation instruction is received. Assume the swap operation is requesting data labeled APP.

Layer 320 shows the state of the swap file LBAs after the data associated with the APP LBAs have been paged in. As shown, the APP LBAs have cross-hatch lines through it to show that these LBAs have been monitored by a swap file manager such as swap file manager 106 of FIG. 1. These monitored LBAs may be included with a trim command issued by swap file manager 106. Layer 330 shows the state of the swap file LBAs after a trimming operation has been applied. As shown, the APP LBAs are free.

Figure 4:
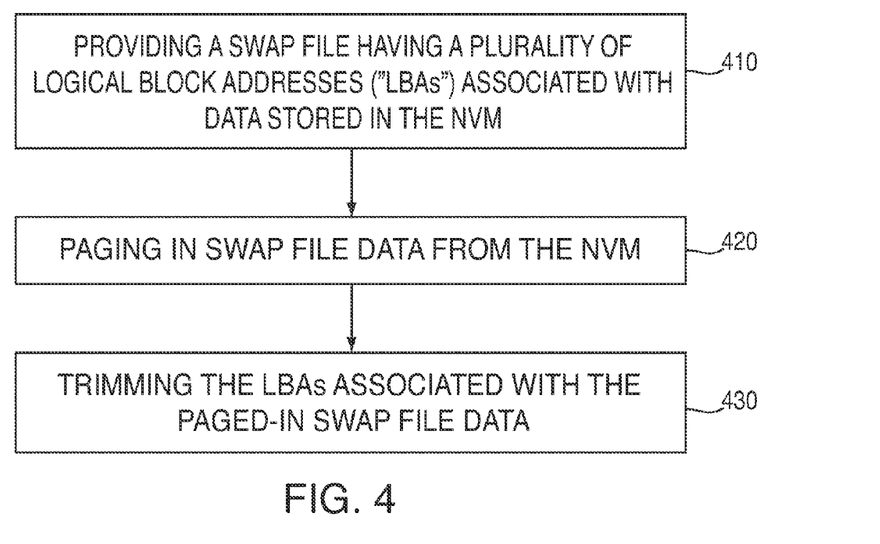
FIG. 4 shows an illustrative flowchart of steps for trimming LBAs in accordance with an embodiment of the invention.

FIG. 4 shows an illustrative flowchart of steps for trimming LBAs in accordance with an embodiment of the invention.

Beginning at step 410, a swap file having several LBAs associated with data stored in the NVM is provided. A file system manager may maintain the swap file and the stored data can be managed by a non-volatile memory interface (e.g., NVM interface 118). The NVM interface may maintain a logical-to-physical mapping of the swap file data (and other data) and manage the data by performing operations such as wear-leveling and garbage collection.

At step 420, data can be paged in from the NVM, for example, in response to a call issued by a file system manager. A swap file manager may monitor LBAs associated with data being paged in. These monitored LBAs may later be used as trimmable LBAs. In one embodiment, the swap file manager may temporarily store the monitored LBAs. After confirmation the data was properly paged in, those stored LBAs may be trimmed.

At step 430, the LBAs associated with the paged in swap file data are trimmed. The LBAs may be trimmed from the swap file maintained by the file system manager and/or by the NVM interface. When the file system manager trims LBAs, it can de-allocate LBAs for subsequent usage in the swap file. When the NVM interface trims LBAs, it can eliminate the need to manage the data contained in physical memory locations.

Figure 5:
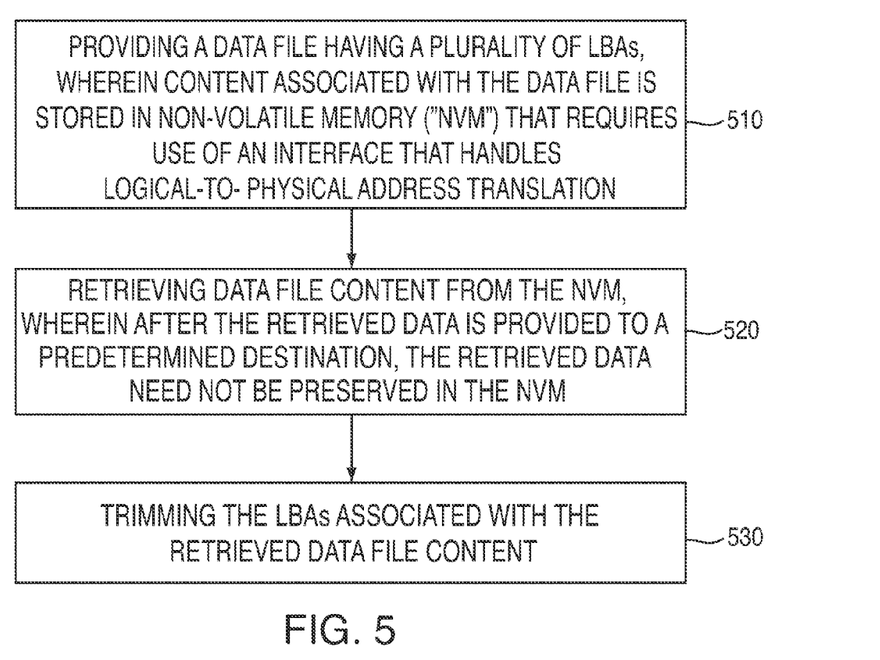
FIG. 5 shows a flowchart of illustrative steps for trimming LBAs of a data file in accordance with an embodiment of the invention.

FIG. 5 shows a flowchart of illustrative steps for trimming LBAs of a data file in accordance with an embodiment of the invention. For example, the data file can be a SQL database. Starting at step 510, a data file having a plurality of LBAs and associated content is stored in NVM such as NVM 120. The storage of the data file content may require the use of an interface (e.g., interface 118) that can translate LBAs to a physical address. The data file may be similar in some respects to the swap file discussed above in that a portion of the LBAs associated with the data file can be trimmed because the data associated with those LBAs are no longer needed after they are retrieved from NVM. For example, the data file can correspond to a database stored on NVM.

At step 520, data file content is retrieved from the NVM. After the retrieved data is provided to a predetermined destination (e.g., volatile memory or one or more redundant NVM systems), the retrieved data need not be preserved in the NVM. At step 530, LBAs associated with the retrieved data file content is trimmed. The LBAs can be trimmed from the data file in a manner similar to how the swap file LBAs are trimmed. In addition, the LBAs can be provided to the NVM interface to enable more efficient management of its translation table and NVM.

It should be understood that processes of FIGS. 4 & 5 are merely illustrative. Any of the steps may be removed, modified, or combined, and any additional steps may be added, without departing from the scope of the invention.

The described embodiments of the invention are presented for the purpose of illustration and not of limitation.

What is claimed is:

1. A method for use with non-volatile memory ("NVM"), the method comprising:
   providing a swap file having a plurality of logical block addresses ("LBAs") associated with data stored in the NVM;
   paging in swap file data from the NVM into volatile memory such that the paged-in swap file exists simultaneously in the NVM and the volatile memory; and
   in response to a successful page in event, trimming the LBAs associated with the paged-in swap file data without deleting the paged-in swap file data, wherein the paged-in swap file data remains in the NVM until a NVM memory management function causes the paged-in swap file data to be removed and wherein the paged-in swap file data contained in the volatile memory is accessible for use by an application.

2. The method of claim 1, wherein the swap file data stored in the NVM previously resided in a volatile memory.

3. The method of claim 1, wherein the trimming further comprises de-allocating the LBAs associated with the paged-in swap file data from the swap file.

4. The method of claim 1, wherein the trimming further comprises marking the LBAs associated with the paged-in swap file data in translation table metadata as invalid.

5. The method of claim 1, wherein the swap file is maintained as allocated by a file system manager even though LBAs within the swap file are trimmed.

6. The method of claim 1, wherein the swap-file data is stored at physical addresses within the NVM based on a logical-to-physical translation of the LBAs.

7. A system comprising:
   volatile memory and non-volatile memory ("NVM"), wherein a portion of the NVM stores swap file data;
   circuitry operative to execute an operating system, the operating system comprising:
      a file system manager operative to manage files, wherein at least one of the files is a swap file; and
      a swap file manager operative to:
         manage page-in and page-out events between the volatile memory and NVM, wherein a paged-in swap file exists simultaneously in the NVM and the volatile memory; and
         in response to a successful page in event, provide trim instructions to trim logical block addresses ("LBAs") associated with the paged-in swap file data to a NVM interface without deleting the paged-in swap file data, wherein the paged-in swap file data remains in the NVM until a NVM memory management function causes the paged-in swap file data to be removed and wherein the paged-in swap file data contained in the volatile memory is accessible for use by an application; and
   wherein the NVM interface is operative to manage the NVM in response to receiving the trim instructions.

8. The system of claim 7, wherein the swap file manager provides the trim instructions to the file system manager, wherein the file system manager trims the LBAs associated with the paged-in swap file data from the swap file.

9. The system of claim 7, wherein the NVM interface is further operative to mark the LBAs associated with the paged-in swap file data in translation table metadata as invalid.

10. The system of claim 7, wherein the NVM interface is further operative to cease maintaining the paged-in swap file data in the NVM.

11. The system of claim 7, wherein the NVM is nand flash memory.

12. A method for trimming logical block addresses ("LBAs") from a swap file, the method implemented in a system comprising a file system layer, a translation layer, and a physical layer, the method comprising:
   maintaining a swap file in the file system layer, the swap file having a plurality of LBAs allocated to swap file data stored in the physical layer;
   paging in swap file data from the physical layer into volatile memory such that the paged-in swap file exists simultaneously in the NVM and the volatile memory;
   in response to a successful page in event, trimming the LBAs associated with the paged-in swap file data from the swap file and from the translation layer without deleting the paged-in swap file data, wherein the paged-in swap file data remains in the NVM until a NVM memory management function causes the paged-in swap file data to be removed and wherein the paged-in swap file data contained in the volatile memory is accessible for use by an application.

13. The method of claim 12, wherein trimming the LBAs associated with the paged-in swap file data decreases a management burden of having to manage the trimmed LBAs in the translation layer.

14. The method of claim 12, wherein trimming the LBAs associated with the paged-in swap file data decreases a management burden of having to manage the swap file data corresponding to the trimmed LBAs that are stored in the physical layer.

15. The method of claim 12, wherein trimming the LBAs associated with the paged-in swap file data further comprises marking the trimmed LBAs for deletion in the translation layer.

16. The method of claim 12, wherein trimming the LBAs associated with the paged-in swap file data from the swap file comprises de-allocating the LBAs corresponding to the trimmed LBAs.

17. A method for trimming logical block addresses ("LBAs") from a data file, the method comprising:
providing a data file having a plurality of LBAs, wherein content associated with the data file is stored in non-volatile memory ("NVM") that requires use of an interface that handles logical-to-physical address translation;
retrieving data file content from the NVM for storage in volatile memory, wherein after the retrieved data is provided to a predetermined destination in the volatile memory, the retrieved data need not be preserved in the NVM even though it exists simultaneously in the NVM and the volatile memory; and
in response to a successful retrieval of the data file content, trimming LBAs associated with the retrieved data file content without deleting the retrieved data file content, wherein the retrieved data remains in the NVM until a NVM memory management function causes the retrieved data to be removed and wherein the retrieved data contained in the volatile memory is accessible for use by an application.

18. The method of claim 17, wherein trimming LBAs comprises de-allocating the LBAs associated with the retrieved data file content from the data file.

19. The method of claim 17, wherein trimming LBAs comprises ceasing management of the retrieved content stored in the NVM.

20. The method of claim 17, wherein the data file is a SQL database file.

* * * * *